United States Patent
Helmersson

(10) Patent No.: US 6,353,652 B1
(45) Date of Patent: Mar. 5, 2002

(54) FUEL ASSEMBLY FOR A BOILING WATER REACTOR

(75) Inventor: Sture Helmersson, Kolbäck (SE)

(73) Assignee: Westinghouse Atom AB (SE)

( * ) Notice: Subject to any disclaimer, the term of this patent is extended or adjusted under 35 U.S.C. 154(b) by 0 days.

(21) Appl. No.: 09/180,151
(22) PCT Filed: Apr. 16, 1997
(86) PCT No.: PCT/SE97/00639
  § 371 Date: Feb. 24, 1999
  § 102(e) Date: Feb. 24, 1999
(87) PCT Pub. No.: WO97/42634
  PCT Pub. Date: Nov. 13, 1997

(30) Foreign Application Priority Data

May 6, 1996 (SE) ................................. 9601710

(51) Int. Cl.$^7$ ............................ G21C 3/32; G21C 3/322
(52) U.S. Cl. .................... 376/435; 376/443; 376/448
(58) Field of Search .............................. 376/353, 434, 376/435, 443–448

(56) References Cited

U.S. PATENT DOCUMENTS

| | | | | |
|---|---|---|---|---|
| 4,544,521 A | * | 10/1985 | Millot et al. | 376/209 |
| 4,666,653 A | * | 5/1987 | Millot et al. | 376/209 |
| 4,844,861 A | * | 7/1989 | Leclercq | 376/439 |
| 5,091,146 A | | 2/1992 | Dix | 376/443 |
| 5,229,068 A | | 7/1993 | Johansson et al. | 376/371 |
| 5,386,439 A | * | 1/1995 | Leroy et al. | 376/209 |
| 5,572,560 A | * | 11/1996 | Brown | 376/435 |
| 5,859,886 A | * | 1/1999 | Nylund | 376/434 |
| 5,878,100 A | * | 3/1999 | Johannesson et al. | 376/435 |

FOREIGN PATENT DOCUMENTS

| | | | | |
|---|---|---|---|---|
| DE | 1957880 | * | 11/1969 | 376/443 |
| EP | 0 505 192 A1 | | 9/1992 | |
| FR | 2416529 | * | 10/1979 | 376/443 |
| FR | 2603416 | * | 3/1988 | 376/443 |
| FR | 2 603 416 | | 3/1988 | |
| JP | 54-000191 | * | 1/1979 | 376/443 |

* cited by examiner

Primary Examiner—Charles T. Jordan
Assistant Examiner—Jack Keith
(74) Attorney, Agent, or Firm—Connolly Bove Lodge & Hutz LLP

(57) ABSTRACT

A fuel assembly for a boiling water reactor comprising full-length fuel rods (3a, 3c) with a first length extending over the height of the entire fuel assembly, and part-length fuel rods (3b) with a second length extending only in the lower part (10) of the fuel assembly, the fuel rods which have positions immediately adjacent to the part-length fuel rods being adapted so as to be bent inwards, in their upper part, towards the open region (15) which is formed above the part-length fuel rods. At least half of the fuel rods in the fuel assembly are straight.

7 Claims, 6 Drawing Sheets

FUEL ASSEMBLY FOR A BOILING WATER REACTOR

TECHNICAL FIELD

The present invention relates to a fuel assembly for a boiling water reactor comprising a plurality of first fuel rods with a first length extending over the height of the entire fuel assembly, and a plurality of second fuel rods with a second length extending only in the lower part of the fuel assembly.

BACKGROUND ART

A core in a boiling water nuclear reactor comprises a plurality of vertically arranged fuel assemblies. A fuel assembly comprises a plurality of vertical fuel rods arranged between a bottom tie plate and a top tie plate in a fuel rod lattice which is usually regular. The fuel rods are retained and fixed by a number of spacers arranged in spaced relationship to each other along the fuel assembly. The fuel rods contain a column of fuel pellets arranged in a cladding tube. The fuel rods are surrounded by a fuel channel which is normally designed with a square cross section.

The core is immersed into water which serves both as coolant and as neutron moderator. During operation, the water flows upwards through the fuel assembly, part of the water thus changing into steam. Hereinafter, coolant means the water and the steam which flow through the fuel assembly. Between the fuel rods, channels are formed in which coolant may flow, so-called coolant channels. In a cross section through a fuel assembly with a regular fuel rod lattice, the coolant channels substantially have an equally large region, which is an advantage since this gives a uniform distribution of coolant flow an enthalpy in the fuel assembly.

Since the coolant in a BWR boils, a ratio of water to steam is formed which varies axially in the core. At the bottom of the core the temperature of the coolant is lower than the boiling temperature and is thus in a single-phase state, that is, only water. At the top of the core, where the coolant has reached the boiling temperature, part of the water is transformed into steam, and the coolant is therefore in a two-phase state. The further up in the core, the higher the percentage of steam in relation to the percentage of water. In the uppermost part of the core, the fuel rods are only covered with a thin film of water, outside of which steam mixed with water droplets flows, a so-called annular flow.

If the heat flow from a fuel rod becomes very large in relation to the coolant flow, there may be a risk of dryout. Dryout means that the liquid film become so thin that it is not capable of holding together, but breaks up resulting in dry wall portions, which locally leads to a considerably deteriorated heat transfer between the fuel rod and the cooling water with an ensuing greatly increased wall temperature of the fuel rod. The increased wall temperature may lead to damage with serious consequences arising on the fuel rods. Thus, it is desirable that each one of the fuel rods in a fuel assembly has an even and thick water film around the whole fuel rod. If the water film at some location of the fuel rod becomes too thin, the risk of dryout increases considerably. The risk of such local dryout determines the power that can be obtained from the whole fuel assembly.

Because of the high percentage of the steam, the pressure drop is higher in the upper part of the fuel assembly than in the lower part thereof. The greater the difference in pressure drop between the upper and lower parts of the fuel assembly, the greater is the risk of the core becoming unstable. To give the fuel assembly good stability properties, a low pressure drop in the upper part of the fuel assembly is aimed at.

When the percentage of steam rises, also the neutron moderation deteriorates in addition to the cooling, since steam is inferior to water as moderator. The reactivity of the reactor depends on the ratio between fuel and moderator. To improve the reactivity, the water/steam ratio in the upper part of the fuel assembly must be increased. One known solution to this problem is to replace some of the fuel rods with part-length fuel rods. Part-length fuel rods have a shorter axial extent than traditional full-length fuel rods and are arranged in the lower part of the fuel assembly. U.S. Pat. No. 5,229,068 discloses a fuel assembly in which the majority of the fuel rods are full-length rods, that is, they extend from the bottom tie plate to the top tie plate, and a smaller number of fuel rods are part-length rods, that is, they extend from the bottom tie plate but terminate somewhat below the top tie plate.

One problem which arises when introducing part-length fuel rods is that, in the upper part of the fuel assembly above the part-length fuel rods, large open regions with a low pressure drop are formed, which means that adjoining coolant channels, where the pressure drop is higher, are emptied of coolant which instead flows into the large open region. A consequence of this is that for the fuel rods which are disposed in a lattice position adjacent to a part-length fuel rod, the water film thins out on the rear side, that is, the side facing away from the part-length fuel rod. Consequently, the risk of dry-out is greatest on the back of the upper part of those fuel rods which are nearest the part-length fuel rods.

It is known, for example from the above-mentioned US specification, to increase the pressure drop in the large open coolant channel by various devices, thus influencing the coolant flow such that the risk of dryout decreases in the surrounding parts of the fuel bundle. The improvement achieved therefore takes place at the expense of an increased pressure drop in the upper part of the fuel assembly, which in turn leads to a deterioration of the stability properties of the fuel assembly.

SUMMARY OF THE INVENTION

The invention aims to reduce the risk of dryout of a fuel assembly in a boiling water reactor comprising both full-length and part-length fuel rods and while maintaining the stability properties of the fuel assembly.

What characterizes a fuel assembly according to the invention will become clear from the appended claims.

According to the present invention, the fuel rods adjoining the large open regions formed above the part-length fuel rods, that is, those fuel rods where the risk of dryout is greatest, are arranged such that, in their upper part, they are bent in a direction towards the centre of the large open regions such that the large open regions decrease in area while at the same time the area of adjacent coolant channels increases. In this way, the transfer of coolant from adjacent coolant channels to the large open regions decreases, whereby the supply of coolant on the back of the bent fuel rods increases and the water film increases in thickness on the back of the fuel rods. The risk of dryout is thus reduced in the fuel assembly.

One advantage of the invention is that the risk of dryout is reduced without any extra means being supplied to the fuel assembly, which contribute to increase the pressure drop in the upper part of the fuel assembly. In this way, the stability properties of the fuel assembly are maintained.

In the French patent document with publication number 2 603 416, a fuel assembly is shown which is intended for a pressurized-water reactor comprising a plurality of first fuel rods with a first length extending over the height of the whole fuel assembly and a plurality of second fuel rods with a second height extending only in the lower part of the fuel assembly, the fuel rods being arranged such that a number of coolant channels for transport of the coolant are formed between the fuel rods. In this fuel assembly the fuel rods are bent such that a regular lattice is obtained both in the upper part of the fuel assembly and in the lower part thereof. The regular lattice in the upper part of the fuel assembly has fewer positions that the lattice in the lower part of the fuel assembly. To achieve this transfer to a different regular lattice, a large majority of the fuel rods have to be bent.

With a fuel assembly according to the invention, the intention is not to achieve a regular lattice in the upper part of the fuel assembly, but to reduce the risk of dryout on certain especially exposed fuel rods. To achieve this, only these especially exposed fuel rods are bent.

DESCRIPTION OF THE PREFERRED EMBODIMENTS

Figure 1:
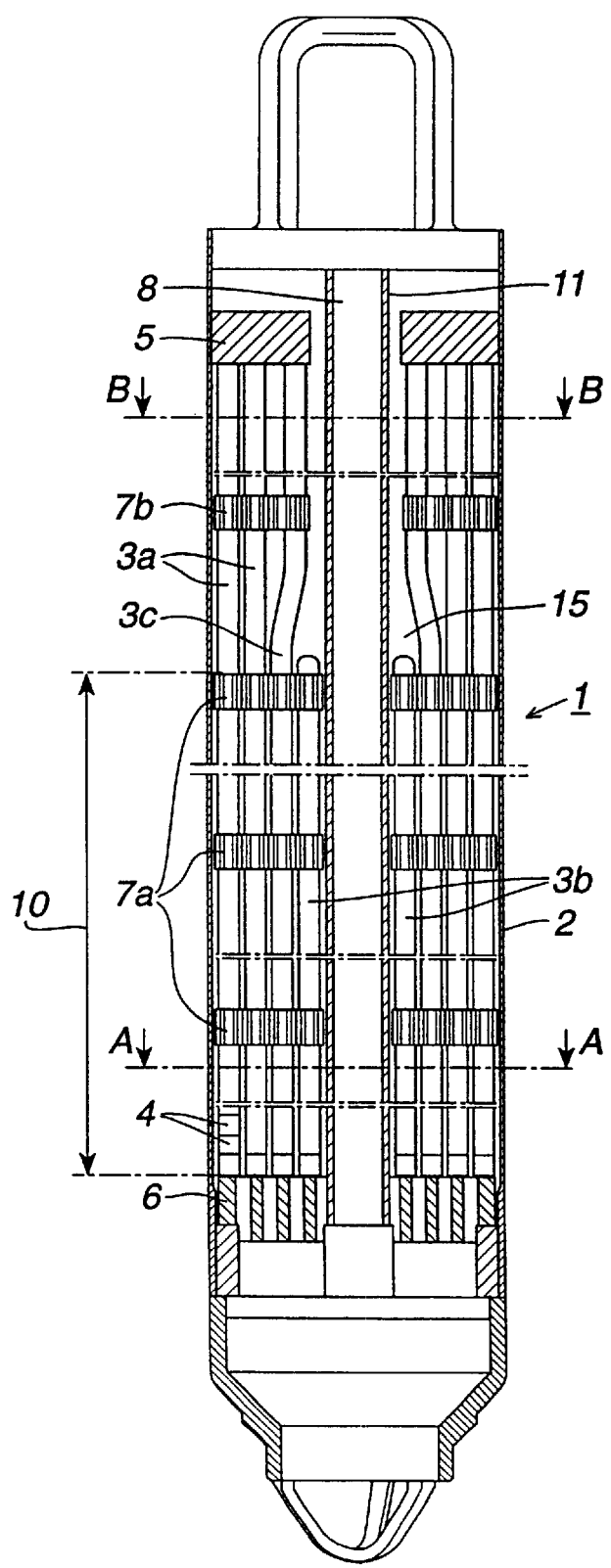
FIG. 1 shows a first fuel assembly according to the invention.
Figure 2A:
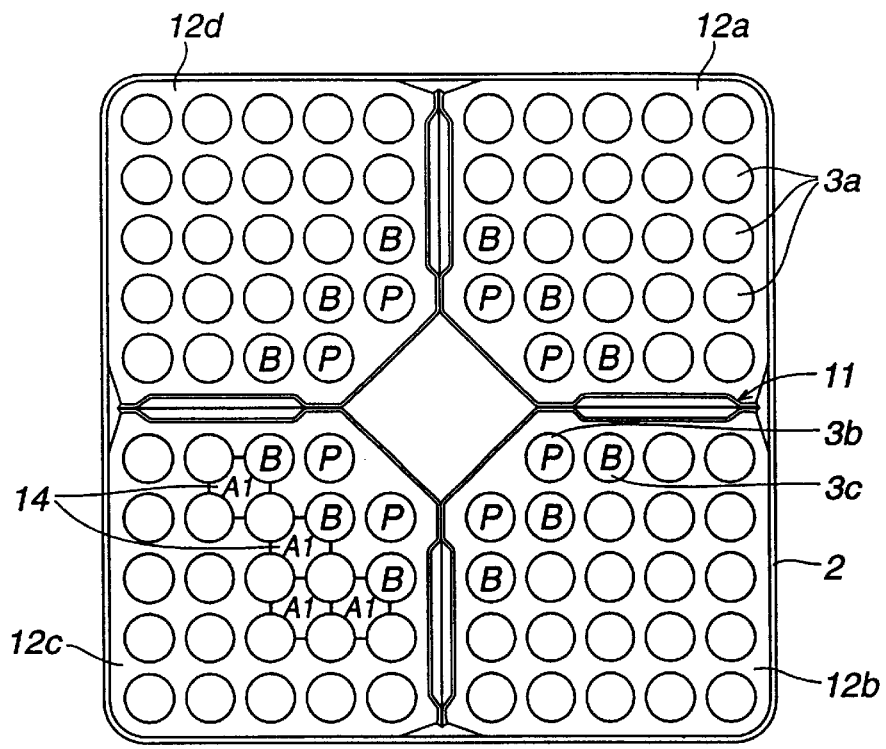
FIG. 2a shows a cross section A—A through the lower part of the fuel assembly in FIGS. 1.
Figure 2B:
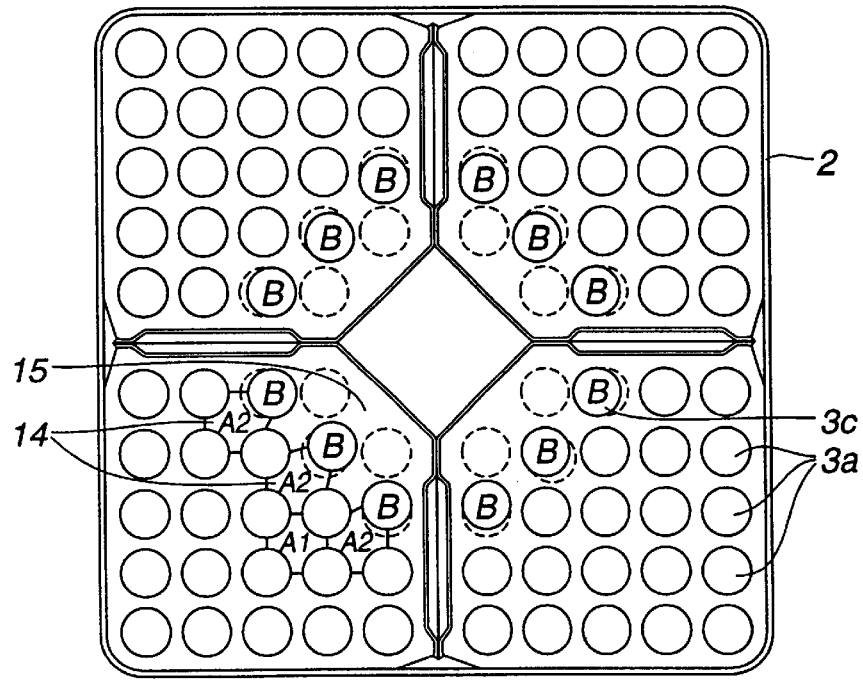
FIG. 2b shows a cross section B—B through the upper part of the fuel assembly in FIG. 1.

FIGS. 1, 2a and 2b show a fuel assembly 1 according to a first embodiment of the invention. FIG. 2a is a cross section A—A through the lower part of the fuel assembly in FIG. 1. FIG. 2b is a cross section B—B through the upper part of the fuel assembly in FIG. 1. The fuel assembly is of boiling-water type and comprises a long tubular container, of rectangular cross section, referred to as a fuel channel 2. The fuel channel 2 is open at both ends, thus forming a through-going flow passage through which coolant flows. The fuel channel 2 is provided with a hollow support means 11 of cruciform cross section, which is secured to the four walls of the fuel channel. The support means comprises four hollow wings and a hollow enlarged cruciform centre. The support means 11 forms a vertical cruciform channel 8 through which non-boiling water flows upwards through the fuel assembly. The fuel channel 2 with support means 11 surround four vertical channel-formed parts 12a–12d, so-called sub-channels, with a substantially square cross section. Each sub-channel contains a fuel bundle comprising a plurality of parallel and spaced apart fuel rods 3a, 3b, 3c. A fuel rod comprises a number of cylindrical pellets 4 of uranium dioxide, stacked on top of each other and enclosed in a cladding tube.

The fuel rods in the lower part of the fuel assembly, FIG. 2a, are arranged in a symmetrical 5×5 grid in which all the fuel rod positions except one are occupied by fuel rods. The non-occupied fuel rod position is located inside the cruciform centre of the support means. The spaces between the fuel rods in positions adjacent each other are traversed by coolant and are referred to hereinafter as coolant channels 14. The coolant channels formed between four fuel rods in positions adjacent to each other have a cross section area A1.

The fuel rods are of three different types, full-length straight fuel rods 3a, part-length fuel rods 3b, and full-length bent fuel rods 3c. The part-length fuel rods 3b have a height which at least corresponds to half the height of the fuel assembly, but may constitute as much as 80% of the height of the fuel assembly. That part of the fuel assembly in which the part-length fuel rods are arranged is referred to in this patent application as the lower part 10 of the fuel assembly. Each sub-bundle comprises two part-length fuel rods 3b and three bent fuel rods 3c. Part-length fuel rods are marked with a P in this figure and in the following figures. Bent fuel rods are marked with a B in this figure and in the following figures.

All the fuel rods 3a, 3b, 3c in a fuel bundle are retained at the bottom by a bottom tie plate 6. The part-length fuel rods 3a, 3c in the fuel bundle are retained at the top by a top tie plate 5. The fuel rods are kept spaced apart from each other by means of spacers 7a, 7b. In the lower part 10 of the fuel assembly, the fuel rods 3a, 3b, 3c are kept in position by the spacers 7a and in the upper part of the fuel assembly the fuel rods 3a, 3c are kept in position by spacers 7b. The part-length fuel rods 3b terminate below the top tie plate 5, usually in or in the vicinity of a spacer.

According to the invention, the bent fuel rods 3c are arranged in positions adjacent the part-length fuel rods 3b and are bent in a direction towards these. The bending begins at the uppermost one of the spacers 7a in the lower part of the fuel assembly and terminates at the lowermost of the spacers 7b in the upper part of the fuel assembly. Before and after the bending, the fuel rod is straight. In this embodiment, the bending takes place between two consecutive spacers, which is an advantage since it is then sufficient with two different spacer types. If the bending is to be large, however, it may be necessary to distribute the bending between several spacers.

According to the invention, the bent fuel rods 3c are arranged in positions adjacent the part-length fuel rods 3b and are bent in direction towards these. The bending begins at the uppermost one of the spacers 7a in the lower part of the fuel assembly and terminates at the lowermost of the spacers 7b in the upper part of the fuel assembly. Before and after the bending, the fuel rod is straight. In this embodiment, the bending takes place between two consecutive spacers, which is an advantage since it is then sufficient with two different spacer types. If the bending is to be large, however, it may be necessary to distribute the bending between several spacers. Bending may be in the interval of 1–10 mm, preferably in the range of 2–4 mm. Also, the spacers are arranged to take up the bending forces during the bending of the fuel rods.

From FIG. 2b it is clear that the grid in the upper part of the fuel assembly is no longer regular. Above the part-length fuel rods an open region 15 is formed. The bent fuel rods 3c are bent inwards towards the open region. The coolant channels which adjoin the open region will thus have a cross-section area A2 in the upper part-of the fuel assembly which is larger than their cross-section area A1 in the lower part of the fuel assembly. The other coolant channels have a cross-section area A1 which is substantially constant in its longitudinal direction.

From FIG. 2b it is clear that the grid in the upper part of the fuel assembly is no longer regular. Above the part-length fuel rods an open region 15 is formed. The ben rods 3c are bent inwards towards the open region. The coolant channels which adjoin the open region will thus have a cross-section area A2 in the upper part of the fuel assembly which is larger than their cross-section area A1 in the lower part of the fuel assembly. The other coolant channels have a cross-section area A1 which is substantially constant in its longitudinal direction. The second cross-sectional area A2 is more than 10% larger than the first cross-sectional area A1. Moreover, the second cross-sectional area A2 may be between 10% and 40% larger than the first cross-sectional area A1.

Figure 3A:
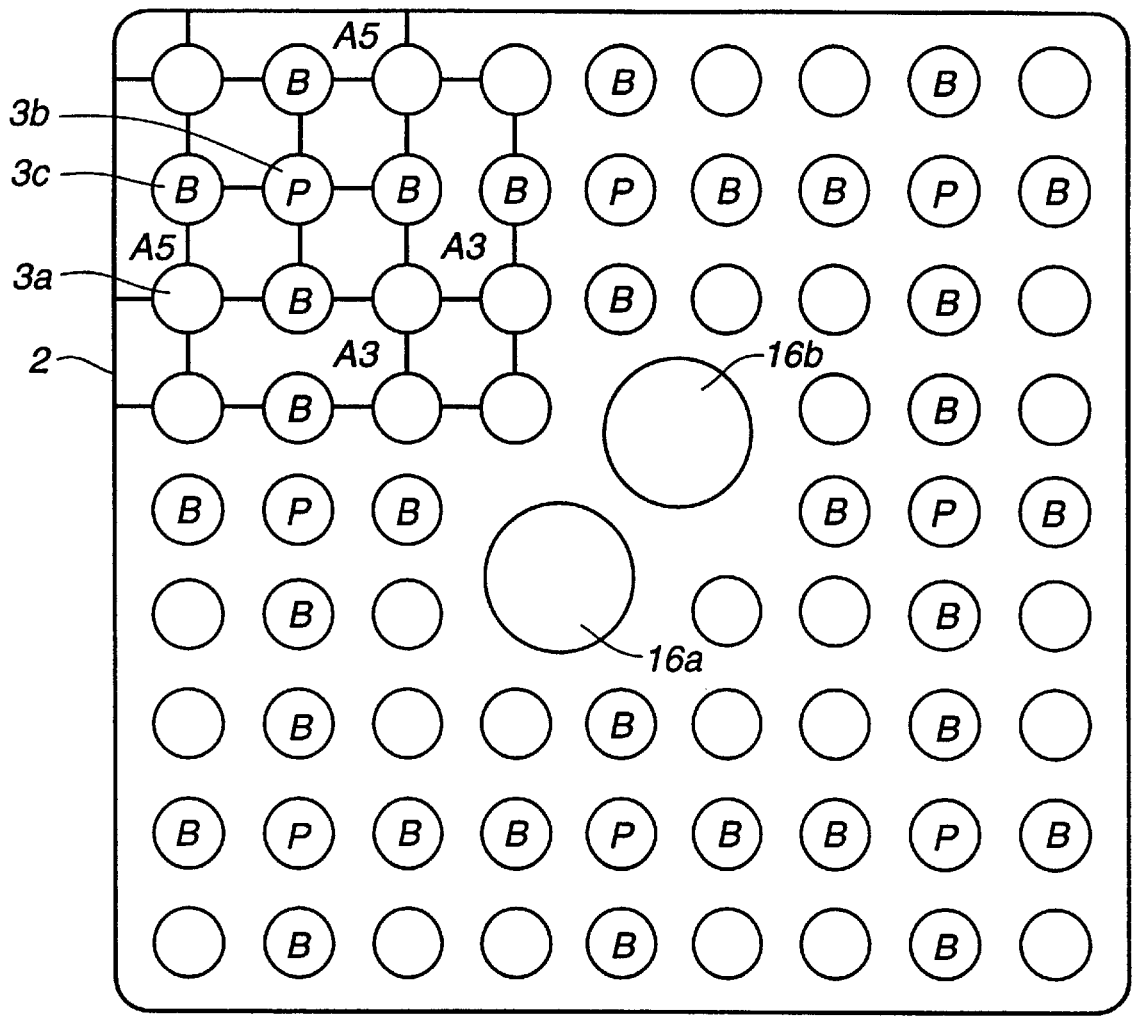
FIG. 3a shows a cross section through the lower part of a second fuel assembly according to the invention.
Figure 3B:
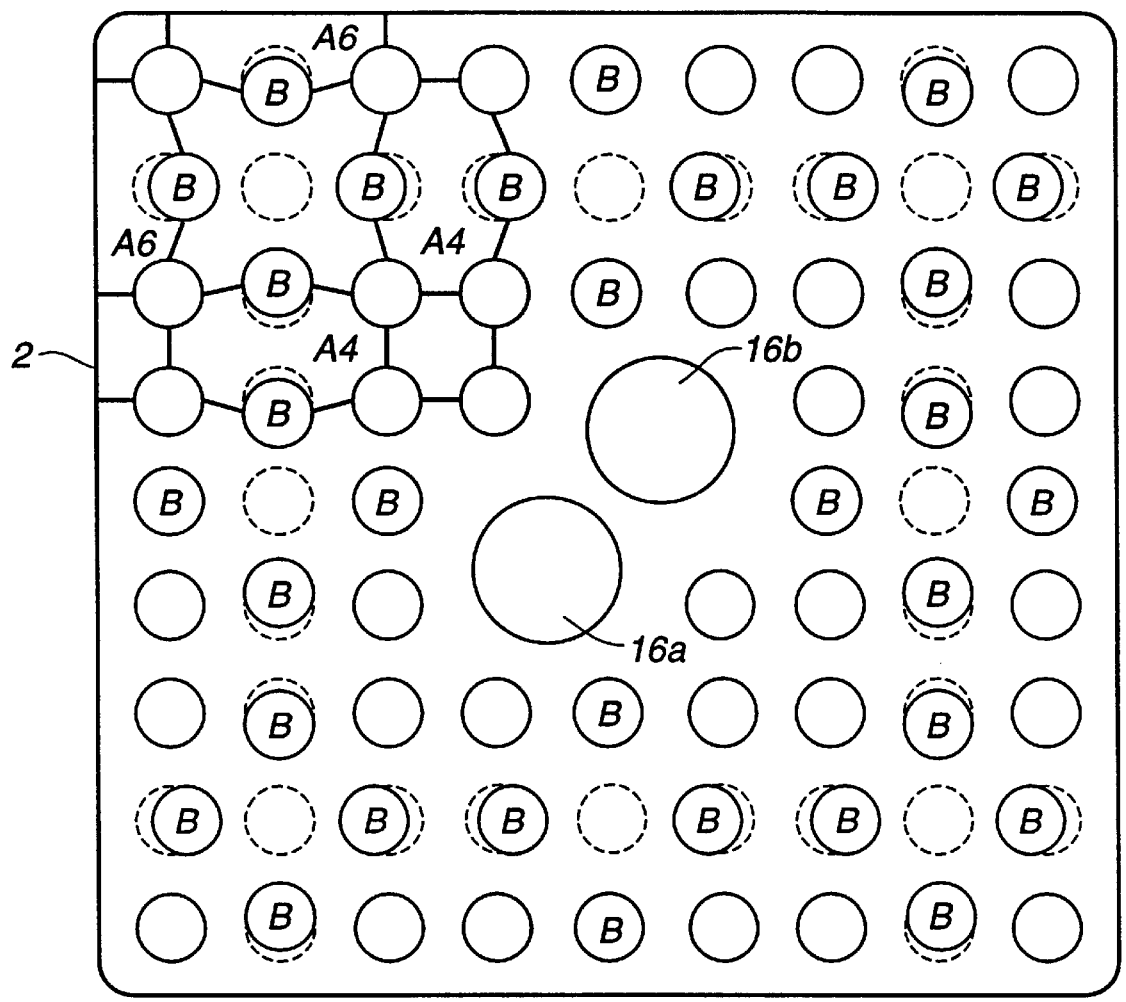
FIG. 3b shows a cross section through the upper part of a second fuel assembly according to the invention.

FIGS. 3a and 3b show the invention applied to a different type of fuel assembly. This fuel assembly comprises two vertical water channels 16a, 16b with a substantially circular cross section. FIG. 3a shows a cross section through the lower part of the fuel assembly. The fuel rods are arranged in a symmetrical 9×9 grid. The fuel assembly has eight part-length fuel rods 3b and the other fuel rods 3a, 3c are full-length rods. FIG. 3b shows a cross section through the upper part of the fuel assembly. The four fuel rods which are arranged immediately adjacent to a part-length fuel rod are bent inwards towards the open region which is formed above the part-length fuel rod. The coolant channels which adjoin the open region above the part-length fuel rod have a cross-section area A4, A6 in the upper part of the fuel assembly which is larger than the cross-section area A3, A5 in the lower part of the fuel assembly.

Figure 4A:
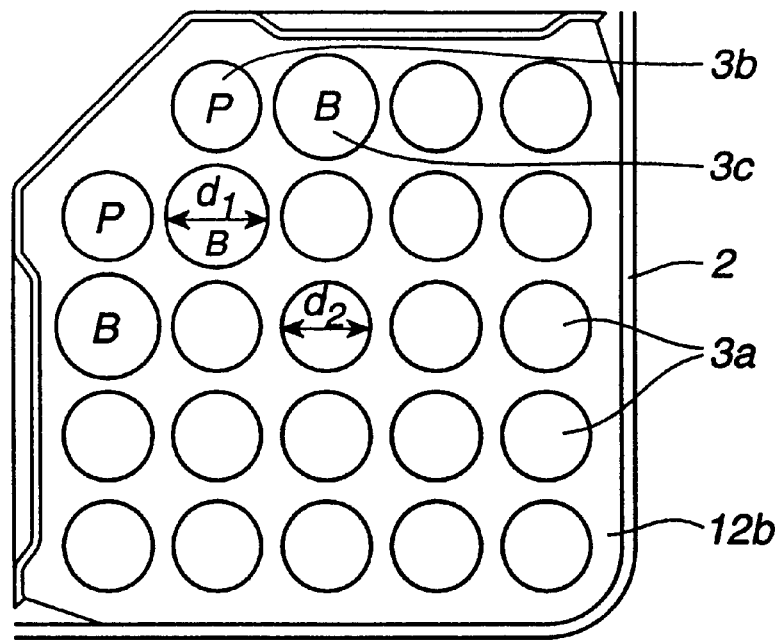
FIGS. 4a and 4b show a further embodiment of the invention.
Figure 4B:
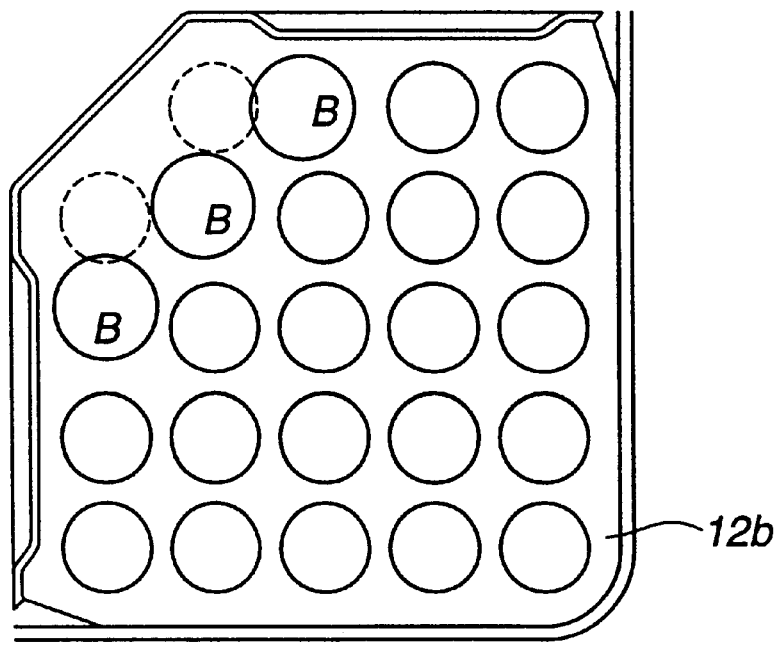

FIGS. 4a and 4b show a further embodiment of the invention. This embodiment differs from the preceding one in that the bent fuel rods 3c have a diameter d1 which is larger than the diameter d2 of the straight, full-length fuel rods 3a. One advantage of arranging the bent rods with a larger diameter is that the distance between the fuel rods is reduced, which results in a reduced transverse flow from the adjoining coolant channels to the open region above the part-length fuel rods. In this embodiment the part-length fuel rods 3b have the same diameter d2 as the straight full-length fuel rods 3a. In another embodiment, the part-length fuel rods 3b may have the same diameter d1 as the bent fuel rods 3b. A disadvantage of also the part-length fuel rods also having a larger diameter is that a larger quantity of uranium is obtained in the lower part of the fuel assembly where the moderation is good.

Figure 5:
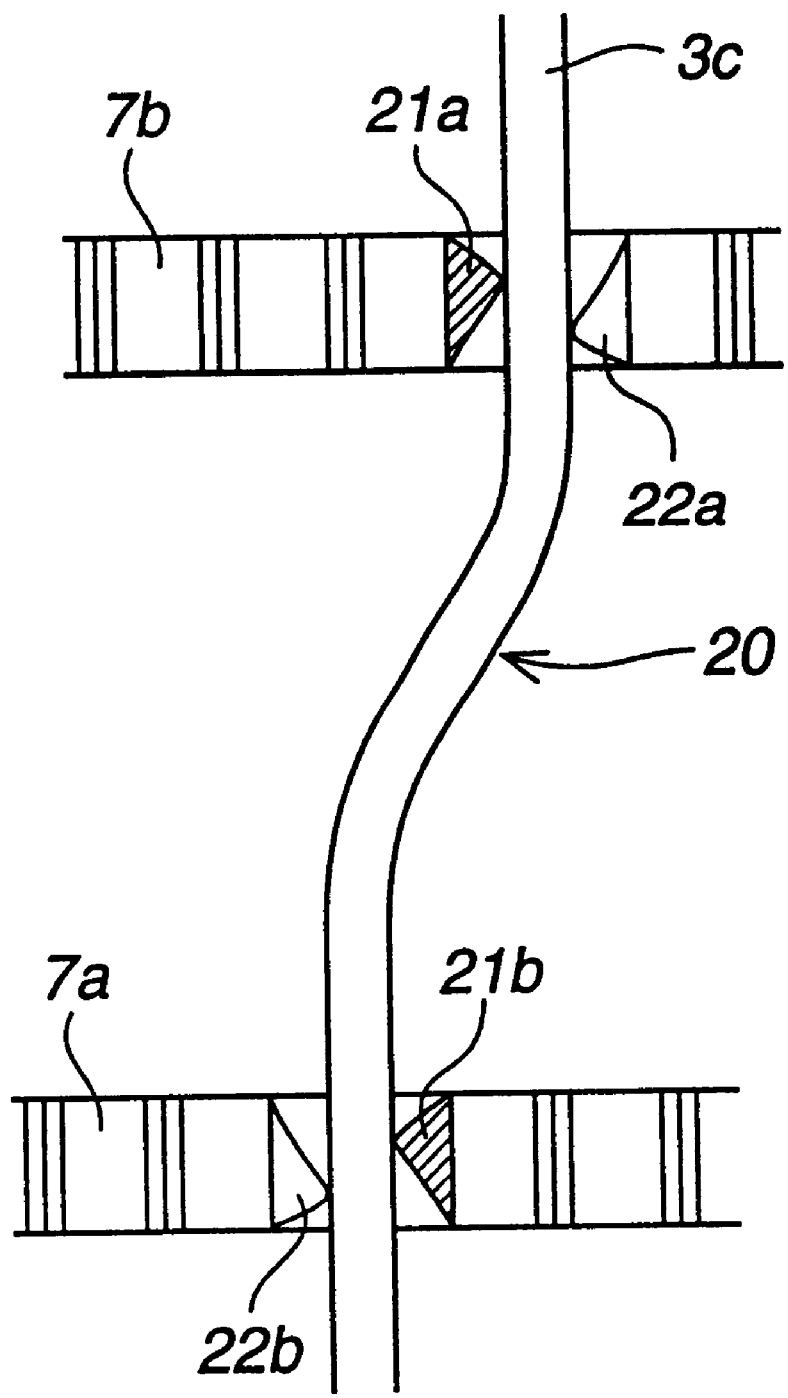
FIG. 5 shows in more detail a bent fuel rod and the design of the spacers which surround the bent fuel rod.

FIG. 5 shows in more detail a bent fuel rod 3c and the design of the spaces which surround the bent fuel rod. The bent rod is fixed to the bottom tie plate and the top tie plate and the rod is bent between two spacers 7a and 7b. The bending forces from the bent rod must be taken up by the spacers, and primarily by the two spacers 7a, 7b which are positioned nearest the bent part 20 of the rod. Most spacer types keep the rods in position by one or more fixed supports as well as by one or more resilient supports. According to the invention, the fixed support are arranged so as to absorb the greatest bending forces, that is, on the concave sides of the rod. Fixed supports 21a, 21b are mounted on one side each of the bent rod, one support 21a being arranged in the spacer 7b above the bent part 20 and the other support 21b being arranged in the spacer 7b below the bent part 20. On the opposite side of the fixed supports, resilient supports 22a, 22b are arranged.

What is claimed is:

1. A fuel assembly for a boiling water reactor wherein during operation coolant flows through the fuel assembly, comprising
   an upper part,
   a lower part (10),
   a plurality of full length rods (3a, 3c) extending through both the lower part and the upper part of the fuel assembly,
   at least one part length rod extending only in the lower assembly part of the fuel assembly, and
   an open region (15) which is formed above the or each part length rod, characterized in that
      at least half of the full length fuel rods having positions immediately adjacent to the or each part length rod are arranged such that they are bent inwards towards the open region (15) above the or each part length rod and at least the majority of the coolant channels which adjoin the open region above the part length rod have a first cross-section area (A1) in the lower part (10) of the fuel assembly and a second cross-section area (A2) in the upper part of the fuel assembly, the second cross-section area being larger than the first cross-section area, and that
      at least half of the fuel rods in the fuel assembly are straight.

2. A fuel assembly according to claim 1, characterized in that the second cross-section area is more than 10% larger than the first cross-section area.

3. A fuel assembly according to claim 1, characterized in that the second cross-section area is between 10% and 40% larger than the first cross-section area.

4. A fuel assembly according to claim 1, characterized in that the bending is in the interval of 1–10 mm.

5. A fuel assembly according to claim 1, characterized in that the bent rods have a first diameter (d1) and the majority of the other fuel rods have a second diameter (d2), the first diameter being larger than the second diameter.

6. A fuel assembly according to claim 1, wherein a number of spacers (7a, 7b) retain and position the fuel rods in spaced relationship to each other and are arranged axially separated along the fuel rods, characterized in that the spacers comprise fixed supports (21a, 21b) which are arranged so as to take up the bending forces during the bending of the fuel rods.

7. A fuel assembly according to claim 4, wherein the bending is in the interval of 2–4 mm.

* * * * *

UNITED STATES PATENT AND TRADEMARK OFFICE
CERTIFICATE OF CORRECTION

PATENT NO. : 6,353,652 B1  
DATED : March 5, 2002  
INVENTOR(S) : Sture Helmersson Page 1 of 1

It is certified that error appears in the above-identified patent and that said Letters Patent is hereby corrected as shown below:

Column 4,  
Lines 27-39, delete this paragraph because the identical language appears at column 4, lines 40-51.

Lines 55-64, delete this paragraph because the identical language appears at column 4, lines 65 through column 5, line 7.

Lines 67, delete "ben" and insert -- bent --.

Signed and Sealed this

Twenty-first Day of May, 2002

Attest:

Attesting Officer

JAMES E. ROGAN  
*Director of the United States Patent and Trademark Office*